United States Patent [19]
McNabb et al.

[11] Patent Number: 5,654,033
[45] Date of Patent: Aug. 5, 1997

[54] SOLID FERTILIZER WITH A MODIFIER BOUND TO ITS SURFACE

[75] Inventors: Gerald James McNabb; Keith Edward Jensen, both of Pocatello, Id.

[73] Assignee: J.R. Simplot Co., Pocatello, Id.

[21] Appl. No.: 542,040

[22] Filed: Oct. 12, 1995

Related U.S. Application Data

[63] Continuation of Ser. No. 151,473, Nov. 12, 1993, abandoned

[51] Int. Cl.⁶ ........................................................ B05D 7/00
[52] U.S. Cl. ........................ 427/212; 427/215; 427/220; 71/64.02; 71/64.03; 71/64.07; 71/64.08
[58] Field of Search ..................................... 427/212, 215, 427/220; 71/64.02, 64.03, 64.07, 64.08

[56] References Cited

U.S. PATENT DOCUMENTS 4,764,200  8/1988  Meiss et al. ............................ 71/64.03

OTHER PUBLICATIONS

Hawley's Condensed Chemical Dictionary, 12th ed., revised by Richard J. Lewis, Sr., pp. 201 and 204 1993.

*Primary Examiner*—Shrive Beck
*Assistant Examiner*—David M. Maiorana
*Attorney, Agent, or Firm*—Wells, St. John, Roberts, Gregory & Matkin, P.S.

[57] ABSTRACT

A surface-modified solid fertilizer product is produced by preparing a mixture of a modifier, a water-soluble calcium salt, and water. The modifier is desirably a nitrification inhibitor such as dicyanodiamide and the calcium salt is desirably calcium chloride. A solid fertilizer is prepared, preferably in granular form. The fertilizer has a component reactive with calcium to produce a water-insoluble precipitate. The mixture is coated onto the solid fertilizer, and the solid fertilizer having the mixture coated thereon is dried. The calcium salt reacts with the reactive component of the fertilizer to produce an insoluble binding agent that binds the modifier to the surface of the fertilizer particles.

16 Claims, 2 Drawing Sheets

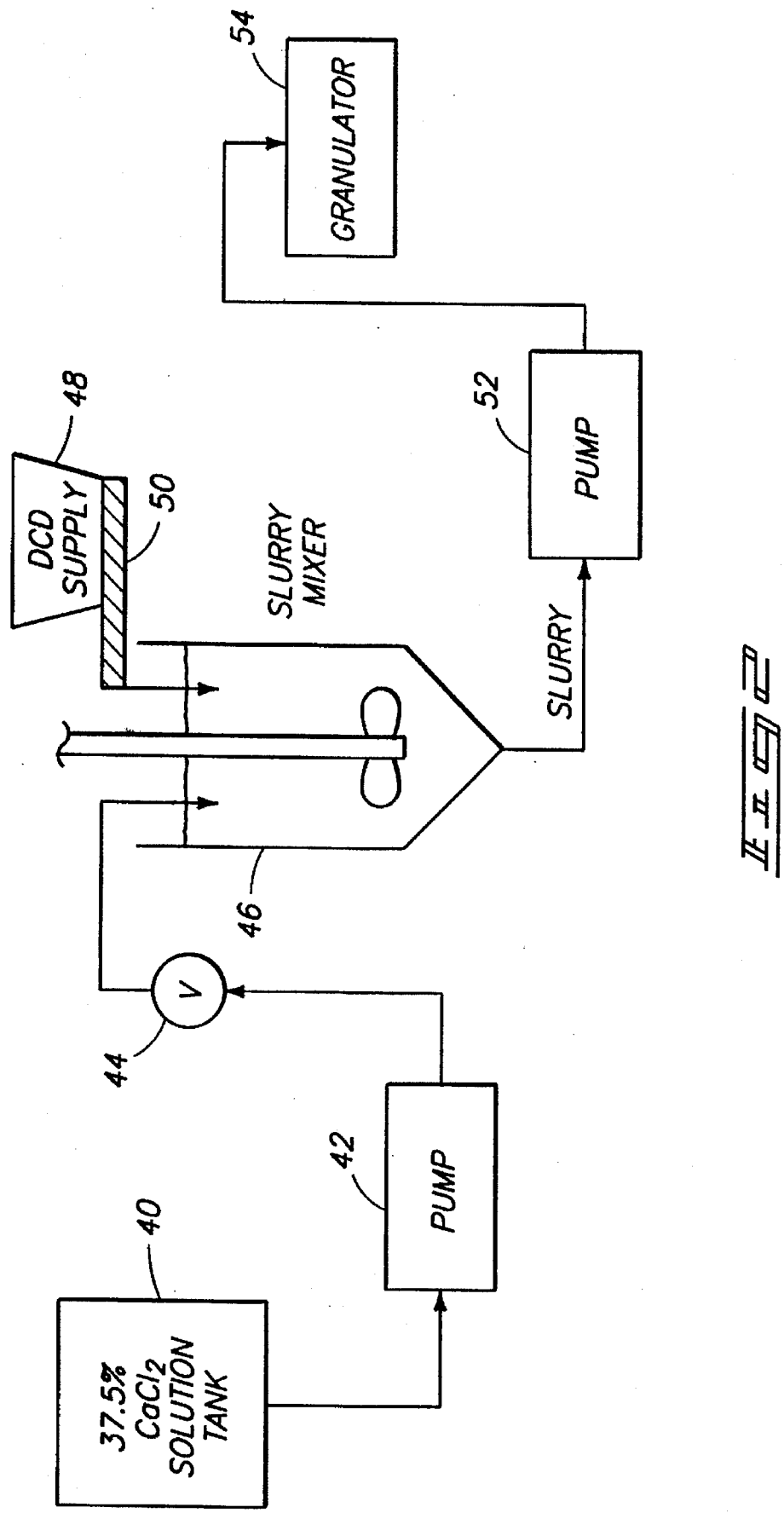

SOLID FERTILIZER WITH A MODIFIER BOUND TO ITS SURFACE

This is a continuation of Ser. No. 08/151,473 filed Nov. 12, 1993, now abandoned.

BACKGROUND OF THE INVENTION

This invention relates to the preparation of modified solid fertilizers, and, in particular, to such fertilizers wherein the modifier is bound to the surface of the fertilizer.

Fertilizers are substances that contain major plant nutrients such as nitrogen, phosphorus, potassium, sulfur, or other elements in a form that is usable by plants. The fertilizer may be a solid or a liquid, and can be applied to the surface of the soil or below the surface. In one popular approach, the fertilizer is manufactured in granular form and provided to the consumer in bulk or in bags. After the fertilizer is applied, the nutrients dissolve into the soil to nourish the plants. The present invention relates primarily to solid fertilizers such as granular fertilizers.

As noted, the fertilizer has traditionally been composed primarily of major plant nutrients. More recently, it has become known to add modifiers to the solid fertilizer. Such modifiers can include, for example, minor nutrients (also called "micronutrients"), herbicides, pesticides, and nitrification inhibitors. In the latter case, a chemical slows the utilization by the plant of the nitrogen prevent in the fertilizer, so as to provide a dosage of nitrogen spread over a period of time rather than in a single large dose. There are a variety of mechanisms of nitrification inhibition, and correspondingly a number of types of chemicals that can be added to the solid fertilizer.

The modifiers can be provided to the fertilizer in two ways. In one, the modifier is mixed with the fertilizer composition, typically prior to granulation, so that the modifier is spread throughout the volume of each particle. In the other, the modifier is supplied to the surface of the particle. Mixing the modifier with the fertilizer composition prior to granulation has the disadvantages that the modifier may be exposed to a high temperature that could reduce its effectiveness, and also that more of the modifier may be used than is otherwise necessary.

Techniques have been developed for supplying the modifier to the surface of the solid fertilizer particles. The modifiers are typically in a very finely divided form. If the modifier is simply dusted onto the surface of the fertilizer particles, there is typically only limited adhesion and much of the modifier is lost to the fertilizer particles during mixing, bagging, distribution, or application to the soil. In a better approach, the finely divided modifier is caused to adhere to the surface of the fertilizer particles by adhesion promoters such as vegetable, animal, or mineral oils. This approach has the disadvantage that a foreign substance is necessarily provided to the soil, which may lead to damage to the plants or pollution.

U.S. Pat. No. 4,764,200 discloses an alternative approach to applying a nitrification inhibitor to the surface of a fertilizer particle. In this process, the finely divided nitrification inhibitor is applied to the surface of a sulfate-containing fertilizer particle, as in a rotating pan device. Aqueous calcium nitrate solution is thereafter sprayed onto the particles. The calcium reacts with the sulfate ions to produce a water-insoluble calcium sulfate binding agent that retains the nitrification inhibitor on the surface of the particles.

This approach may be useful on a laboratory scale, but the inventors have determined that, when applied in a commercial operation, it may have the important drawback that a great deal of the dust of the nitrification inhibitor is produced. This dust must be recovered, both because the nitrification inhibitor is expensive and also because it should not be released into the atmosphere. A solid recovery system is therefore required. Moreover, the operation requires two stages of application, the mixing of the nitrification inhibitor with the fertilizer particles, and spraying the aqueous calcium nitrate solution onto the particles. There may also be a tendency to agglomeration of the particles due to the hygroscopic nature of calcium nitrate. Finally, it is possible that incomplete application of the calcium nitrate solution can result in incomplete coating of the fertilizer particles.

There is needed an improved approach to the preparation of surface-modified solid fertilizers. The modifier should be well bound to the surfaces of the particles, and the production process should be effective and economic. The present invention fulfills this need, and further provides related advantages.

SUMMARY OF THE INVENTION

The present invention provides a method for preparing a solid fertilizer having a modifier attached to the surfaces of the fertilizer particles, and the unique resulting product. The solid modifier bound to the surface with a calcium-based precipitated structure. The approach of the invention uses only a single application step, and does not require any solids-cleanup apparatus to collect and process the dust of the modifier. In a preferred approach, caking and agglomeration of the material is minimized.

In accordance with the invention, a method for producing a fertilizer product having a solid fertilizer with a modifier bound thereto comprises the steps of preparing a mixture of a modifier, a water-soluble calcium salt, and water, and providing a solid fertilizer having therein a component reactive with calcium to produce a water-insoluble precipitate. The method includes coating the mixture onto the solid fertilizer, and drying the solid fertilizer having the mixture coated thereon.

A wide range of modifiers, including for example micronutrients, herbicides, pesticides, and nitrification inhibitors, can be used. The calcium salt is preferably a calcium halide, most preferably calcium chloride. The proportions of the ingredients of the mixture can be adjusted as necessary for ease of application and control of the amount of the modifier on the surface of the fertilizer particles.

In a particularly preferred approach, a method for producing a fertilizer product having a solid fertilizer with a modifier bound thereto comprises the steps of preparing a mixture of a nitrification inhibitor, a calcium halide, and water, and providing a solid ammonium sulfate fertilizer. It is preferred not to use calcium nitrate or other hygroscopic sources of calcium for incorporation into the binding agent. A preferred nitrification inhibitor is dicyanodiamide (abbreviated "DCD"). The mixture is coated onto the solid fertilizer, as by spraying of the mixture to the fertilizer in a granulation apparatus, and the solid fertilizer having the mixture coated thereon is dried, as in a drum dryer.

The preparation of a slurried mixture of the modifier, the calcium salt, and water prior to application to the fertilizer has the important benefits that dust production is eliminated and also that the number of process steps in the actual application of the modifier to the surface is reduced. Process capital and operating costs are thereby reduced. Also, there is a greater certainty that all of the divided will adhere to the surface of the fertilizer particles, and will not be lost because of incomplete application of a spray to the surface of the particles.

Although a particular embodiment of the invention has been described in detail for purposes of illustration, various modifications and enhancements may be made without departing from the spirit and scope of the invention. Accordingly, the invention is not to be limited except as by the appended claims.

BRIEF DESCRIPTION OF THE DRAWINGS

FIG. 1 is a process flow chart for the approach of the invention;

DETAILED DESCRIPTION OF THE INVENTION

Figure 2:
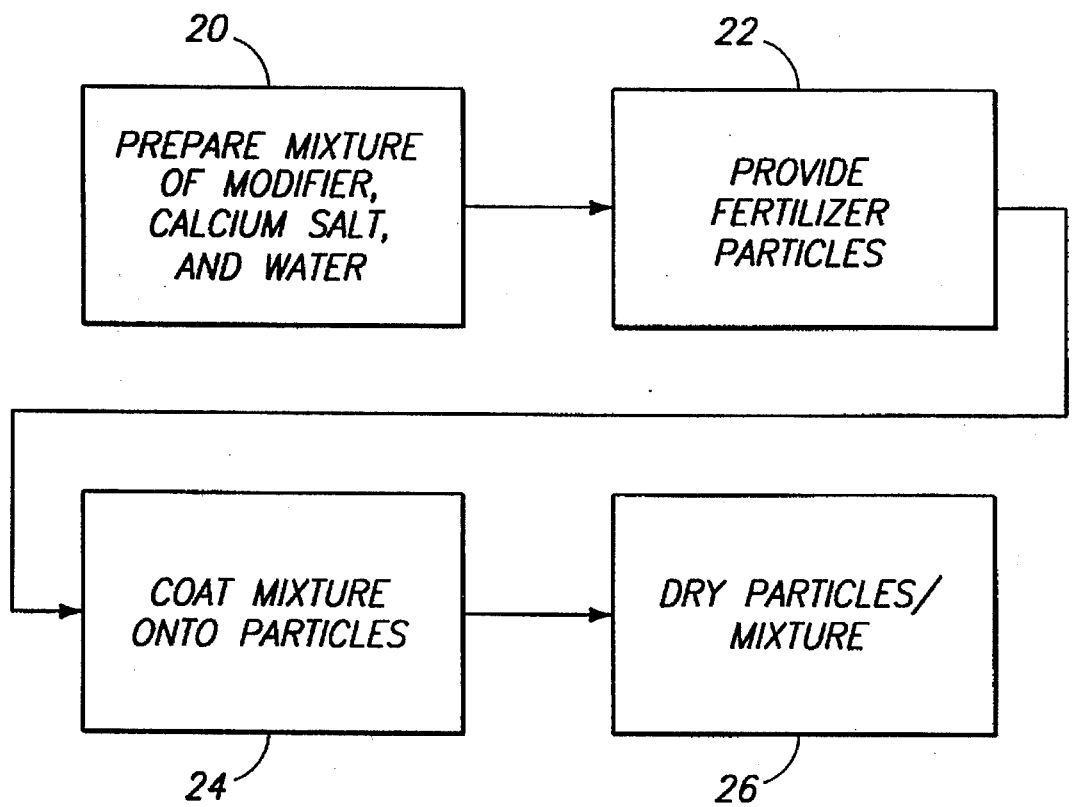
FIG. 2 is a block diagram of an apparatus used in practicing the invention.

Referring to FIG. 1, the present approach provides a method for producing a fertilizer product having solid fertilizer particles with a modifier bound to the surface of the particles. The method begins with the preparation of a mixture of a modifier, a water-soluble calcium salt, and water, numeral 20 of FIG. 1. The modifier is preferably a nitrification inhibitor such as dicyanodiamide ("DCD"). Alternatively, the modifier can be other nitrification inhibitors, micronutrients such as minor elements required for plant growth, herbicides, or pesticides. The present approach also permits combinations of these modifiers to be used as well. Such modifiers are typically available in a finely divided form similar in appearance and consistency to talcum powder or the like. The modifiers are typically quite expensive, and it is therefore highly desirable that they not be wasted during production, distribution, or application.

The mixture further includes a water-soluble calcium salt. The calcium salt is preferably an inorganic salt of calcium, so that organic components are not added to the soil. A preferred calcium salt is one of the calcium halides, including calcium fluoride, calcium chloride, calcium bromide, and calcium iodide. A most preferred calcium salt is calcium chloride, which is inexpensive, not significantly hygroscopic, and does not leave an undesirable residual chemical in the soil when used in the amounts typical for the present invention.

The modifier and the calcium salt are mixed together with sufficient water to form a slurry of a desired consistency for application. The calcium salt must be present in an amount sufficient to serve as a binder for the modifier after subsequent reaction. The proportions of the two components can vary depending upon the nature of modifier, the nature of the calcium salt, the nature and particle size of the fertilizer, and the mode of application of the mixture to the fertilizer. The amount of dicyanodiamide is sufficient to amount to from about 1 to about 6 percent by weight of the final fertilizer product.

In a typical case using dicyanodiamide nitrification inhibitor as the modifier, for each 100 parts by weight of the dicyanodiamide, the amount of calcium chloride is from about 45 to about 60 parts by weight. The proportion of water is selected to permit application of the mixture to the fertilizer, and can be adjusted as necessary. For pump application to a mass of fertilizer granules, the amount of water is typically less than for spray application. In the typical case discussed above, for each 100 parts by weight of dicyanodiamide, the amount of water has been varied from 100 to 260 parts by weight with success. These proportions are not critical, however, and can be varied as necessary.

The mixing step 20 is accomplished in any convenient manner. For example, the mixing may be accomplished in a tank with a slowly stirring impeller to prevent separation of the mixture. The mixture is a slurry of the modifier in the aqueous calcium salt solution.

Fertilizer particles are provided, numeral 22. The production of granular or other solid particulate fertilizers is well known, and such fertilizer particles are available commercially. The present invention is desirably implemented at the end of a commercial fertilizer particulate production line, so that the heat retained in the solid fertilizer as a result of its formation can aid in vaporizing excess moisture from the mixture after it is applied.

The fertilizer includes a component reactive with calcium to produce a water-insoluble precipitate. A preferred component is sulfate, present in ammonium sulfate fertilizers. A typical ammonium sulfate fertilizer has a composition of 24-0-0-24 (parts by weight of nitrogen, phosphorus, potassium, and sulfur, respectively). Ammonium phosphate fertilizers are also operable. Nitrification inhibitors are less likely to be used with an ammonium phosphate fertilizer, and micronutrients, herbicides, and pesticides are more often used.

The slurried mixture of modifier and aqueous calcium salt solution is coated onto the solid fertilizer particles, numeral 24. The coating can be accomplished in the granulator apparatus used to form the fertilizer particles. In this embodiment, the fertilizer is at a temperature of about 60° C. to 130° C. Coating can be accomplished by any suitable technique, such as pumping the mixture into the apparatus and allowing it to distribute onto the fertilizer particles. Coating can also be accomplished by spraying or other technique.

Finally, the fertilizer with the coated mixture is dried, numeral 26. Drying is accomplished with any suitable apparatus, such as a conventional drum dryer.

As the water is removed from the slurried mixture in the drying step 26, the calcium in the aqueous phase reacts with the sulfate at the surface of the fertilizer particles to form a binder structure. The solid modifier is captured by the binder structure as it forms, producing a smooth, hard surface layer of the bound modifier material.

The present approach for preparing the modifier-coated fertilizer particles produces results superior to those previously known for producing modifier-coated fertilizer particles. There are no oils introduced into the soil, as in the process wherein oils are used to bind nitrification inhibitors to the surface of the particles.

The present approach can be accomplished with the same commercial-scale apparatus used in conventional granulated fertilizer production in a single application step. By way of contrast, the two-step approach of U.S. Pat. No. 4,754,200 requires a first application step of applying the nitrification inhibitor to the particles, and then a second application step of spraying a calcium nitrate solution onto the particles. The prior approach requires a dry material feeder for the nitrification inhibitor into the coating unit, and a spraying unit. The present approach requires only a pump or sprayer for introducing the mixture into the coating apparatus. A major modification to the granulation plant process apparatus is therefore required in the prior approach but not the present approach.

Moreover, the prior approach is less reliable in achieving a uniform modifier coating on the particles. In the method of the '200 patent, the solid nitrification inhibitor is mixed with the solid fertilizer particles. It is assumed that the nitrification inhibitor will assume a uniform coating that does not dislodge or otherwise fall away after the coating and before the spraying of the calcium nitrate solution. While the assumption of a stable coating at this stage is appropriate in a laboratory-scale, bench-top operation, it is often not true in a commercial-scale fertilizer production plant.

Finally, in the prior approach of the '200 patent there is necessarily a dust of the nitrification inhibitor produced in the coating apparatus prior to spraying the calcium nitrate solution onto the coated particles. The dust is removed with the moisture in the dryer. The nitrification inhibitor is an expensive organic chemical, preferably dicyanodiamide. This modifier should be recovered for both economic and environmental reasons, requiring the addition of a downstream dust cleanup device.

Thus, while the approach of the '200 patent may be operable under some circumstances, it simply is not the best way to proceed in a commercial-scale operation. The present approach provides greater uniformity of application, requires much less significant changes to the commercial fertilizer production machinery, and avoids the need for a downstream dust cleanup device.

FIG. 2 illustrates the preferred form of the mixing apparatus utilized in practicing the invention. An aqueous solution of 37.5 weight percent calcium chloride ($CaCl_2$) is prepared in a solution tank 40. The solution is pumped by a pump 42, through a flow control valve 44, and into a slurry mixer 46. Separately, a flow of DCD is metered from a supply of solid DCD 48 to the slurry mixer 48 by a controllable speed auger 50. The ratio of calcium chloride solution to solid DCD is established so that the resulting slurry is readily pumped and applied to the fertilizer. The slurry of DCD in calcium chloride solution is pumped from the slurry mixer 46 by a pump 52 to a granulator 54, where the slurry is mixed with the fertilizer.

Figure 3:
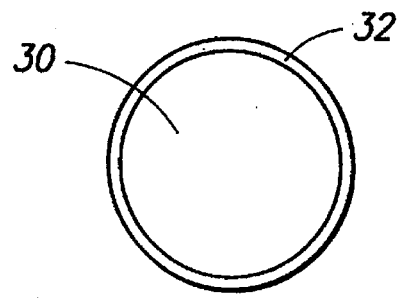
FIG. 3 is a schematic sectional view of a fertilizer particle having a surface modified according to the present approach.

FIG. 3 illustrates a modifier-coated fertilizer product of the invention. Each granule includes a fertilizer particle 30 covered with a coating of the modifier 32.

The present invention has been reduced to practice. The following examples are presented to illustrate aspects of the invention, but should not be taken as limiting the invention in any respect.

EXAMPLE 1

A slurried mixture of 1000 pounds of water, 600 pounds of calcium chloride, and 1000 pounds of dicyanodiamide are mixed together in a mixing tank. Ammonium sulfate fertilizer is manufactured in a conventional fertilizer production plant and introduced into a granulator. After the granular particles are formed, the slurried mixture is pumped into the granulator so as to coat the fertilizer particles. The weight of fertilizer was about 20,000 pounds, and the weight of the mixture was 2600 pounds. After coating, the fertilizer granules with the applied mixture was dried. The resulting granules were smooth and dustless, and had a total of about 5 percent by weight of the dicyanodiamide.

EXAMPLE 2

Example 1 was repeated, except that the slurried mixture had 100 parts by weight of water, 45 parts by weight of calcium chloride, and 100 parts by weight of dicyanodiamide. The mixture was applied to 900 parts by weight of ammonium sulfate granules to produce a smooth, dustless product after drying.

EXAMPLE 3

Example 1 was repeated, except that the slurried mixture had 13 parts by weight of water, 5.5 parts by weight of calcium chloride, and 5 parts by weight of dicyanodiamide. The mixture was applied to 195 parts by weight of ammonium sulfate granules to produce a smooth, dustless product after drying.

Although a particular embodiment of the invention has been described in detail for purposes of illustration, various modifications and enhancements may be made without departing from the spirit and scope of the invention. Accordingly, the invention is not to be limited except as by the appended claims.

What is claimed is:

1. A method for producing a fertilizer product having a solid fertilizer with a modifier bound thereto, comprising the steps of:

providing a solid fertilizer having therein a component reactive with calcium to produce a water-insoluble precipitate;

preparing a mixture of a modifier, a water-soluble calcium salt, and water, the step of preparing being conducted without the solid fertilizer present;

coating the mixture onto the solid fertilizer; and drying the solid fertilizer having the mixture coated thereon.

2. The method of claim 1, wherein step of preparing a mixture includes the step of providing a calcium salt selected from the group consisting of the calcium halides.

3. The method of claim 1, wherein the step of preparing a mixture includes the step of providing the calcium salt calcium chloride.

4. The method of claim 1, wherein the step of preparing a mixture includes the step of providing a modifier selected from the group consisting of a micronutrients, a herbicide, and a pesticide.

5. The method of claim 1, wherein the step of preparing a mixture includes the step of providing a modifier that is a nitrification inhibitor.

6. The method of claim 1, wherein the step of preparing a mixture includes the step of providing the modifier dicyanodiamide.

7. The method of claim 1, wherein the step of providing a solid fertilizer includes the step of providing granulated ammonium sulfate fertilizer.

8. A method for producing a fertilizer product having a solid fertilizer with a modifier bound thereto, comprising the steps of:

providing a granulated ammonium phosphate-containing fertilizer having therein a component reactive with calcium to produce a water-insoluble precipitate;

preparing a mixture of a modifier, a water-soluble calcium salt, and water, the step of preparing being conducted without the solid fertilizer present;

coating the mixture onto the solid fertilizer; and drying the solid fertilizer having the mixture coated thereon.

9. The method of claim 1, wherein the step of coating the mixture includes the step of adding the mixture to the solid fertilizer in a granulator.

10. The method of claim 1, wherein the step of drying includes the step of placing the solid fertilizer with the mixture coated thereon into a rotary dryer.

11. A method for producing a fertilizer product having a solid fertilizer with a modifier bound thereto, comprising the steps of:

providing a solid ammonium sulfate-containing fertilizer;

preparing a mixture of a nitrification inhibitor, a calcium halide, and water, the step of preparing being conducted without the solid fertilizer present;

coating the mixture onto the solid fertilizer; and drying the solid fertilizer having the mixture coated thereon.

12. The method of claim 11, wherein the step of preparing a mixture includes the step of providing the nitrification inhibitor dicyanodiamide.

13. The method of claim 11, wherein the step of preparing a mixture includes the step of providing calcium chloride.

14. The method of claim 11, wherein the step of coating the mixture includes the step of adding the mixture to the solid fertilizer in a granulator.

15. The method of claim 11, wherein the step of drying includes the step of placing the solid fertilizer with the mixture coated thereon into a rotary dryer.

16. A method for producing a fertilizer product having a solid fertilizer with a modifier bound thereto, comprising the steps of:

providing a granulated ammonium phosphate-containing fertilizer;

preparing a mixture of a nitrification inhibitor, a calcium halide, and water, the step of preparing being conducted without the solid fertilizer present;

coating the mixture onto the solid fertilizer; and drying the solid fertilizer having the mixture coated thereon.

* * * * *

UNITED STATES PATENT AND TRADEMARK OFFICE
CERTIFICATE OF CORRECTION

PATENT NO. : 5,654,033

DATED : August 5, 1997

INVENTOR(S) : Gerald James McNabb et. al.

It is certified that error appears in the above-identified patent and that said Letters Patent is hereby corrected as shown below:

In the title page and column 1, line 1, change "SURFACE" to --SURFACES--.

Col. 1, ln. 27: Replace "prevent" with --present--.

Col. 2, ln. 24: Add --is-- after "modifier".

Col. 2, ln. 64: Replace "divided" with --finely divided modifier--.

Col. 4, ln. 53: Replace "4,754,200" with --4,764,200--.

Col. 5, ln. 29: Replace second occurrence of "48" with --46--.

Col. 6, ln. 31: Replace "micronutrients" with --micronutrient--.

Signed and Sealed this

Twelfth Day of May, 1998

Attest:

BRUCE LEHMAN

*Attesting Officer*  *Commissioner of Patents and Trademarks*